United States Patent
Rangarajan et al.

(10) Patent No.: US 6,683,946 B2
(45) Date of Patent: *Jan. 27, 2004

(54) LOCAL EXCHANGE CARRIER ESCAPE LIST FOR LOCAL NUMBER PORTABILITY

(75) Inventors: Kasiviswanathan Rangarajan, Garland, TX (US); Bert Lee Frey, Jr., Allen, TX (US)

(73) Assignee: Ericsson Inc, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,340

(22) Filed: Dec. 11, 1998

(65) Prior Publication Data

US 2003/0123637 A1 Jul. 3, 2003

(51) Int. Cl.[7] .................................................. H04M 7/00
(52) U.S. Cl. .............................. 379/221.13; 379/221 R
(58) Field of Search ........................ 379/112.01, 211.02, 379/221.02, 221.13, 207.04, 219, 220.01, 221.08, 221.09, 221.1, 221.11, 221.12

(56) References Cited

U.S. PATENT DOCUMENTS

| | | | | |
|---|---|---|---|---|
| 5,572,579 A | * | 11/1996 | Orriss et al. ................. | 379/111 |
| 5,602,909 A | * | 2/1997 | Carkner et al. .............. | 370/385 |
| 5,610,977 A | * | 3/1997 | Williams et al. ............. | 370/385 |
| 5,625,681 A | * | 4/1997 | Butler, II ................ | 379/221.02 |
| 5,689,555 A | * | 11/1997 | Sonnenberg ............ | 379/211.02 |
| 6,005,925 A | * | 12/1999 | Johnson et al. ......... | 379/115.02 |
| 6,058,313 A | * | 5/2000 | Slutsman et al. ....... | 379/221.13 |
| 6,097,801 A | * | 8/2000 | Williams et al. ........ | 379/221.13 |
| 6,108,332 A | * | 8/2000 | Kasiviswanathan ......... | 370/360 |
| 6,130,940 A | * | 10/2000 | Wong et al. ............ | 379/221.09 |

* cited by examiner

Primary Examiner—Fan Tsang
Assistant Examiner—Gerald Gauthier

(57) ABSTRACT

A telecommunications system and method for managing Local Number Portability (LNP) querying for calls routed to Local Exchange Carriers by providing a list of carriers in the Service Switching Point (SSP) (local service provider) for whom LNP querying is to be performed by the SSP. For example, calls destined to carriers on the list will be queried by the originating SSP, or other intermediate SSP, and calls destined for carriers not on the list will not be queried by the originating SSP, but instead will be directly routed to the carrier for LNP querying. Advantageously, the local service providers (SSPs) can perform LNP queries for calls destined to certain carriers and charge them for the queries. This will enable small local exchange carriers to provide competitive service in the network by purchasing the LNP querying facility from the SSPs. Furthermore, LNP querying will now be able to be provided for every call routed through an Local Exchange Carrier (LEC), regardless of whether the LEC has LNP querying capability.

39 Claims, 4 Drawing Sheets

LOCAL EXCHANGE CARRIER ESCAPE LIST FOR LOCAL NUMBER PORTABILITY

BACKGROUND OF THE PRESENT INVENTION

FIELD OF THE INVENTION

The present invention relates generally to telecommunications systems and methods for managing ported calls, and specifically to Service Switching Points (SSPs) selectively performing Local Number Portability (LNP) queries for calls routed to Local Exchange Carriers (LEC).

BACKGROUND AND OBJECTS OF THE INVENTION

In modern telecommunications networks, signaling constitutes the distinct control infrastructure that enables provision of all other services. It can be defined as the system that enables stored program control exchanges, network databases, and other "intelligent" nodes of the network to exchange: (a) messages related to call setup, supervision, and tear-down; (b) information needed for distributed applications processing (inter-process query/response); and (c) network management information.

In addition, the Intelligent Network (IN) and the new Advanced Intelligent Network (AIN) have made possible the transfer of all types of information through the telephone network without special circuits or long installation cycles. In the IN/AIN, everything is controlled or configured by workstations with user-friendly software. Telephone service representatives can, therefore, create new services and tailor a subscribers service from a terminal while talking with the customer. These changes are immediately and inexpensively implemented in the switches, rather than by the more traditional method: expensive programming changes made by certified technicians.

The IN consists of a series of intelligent nodes, each capable of processing at various levels, and each capable of communicating with one another over data links. The basic infrastructure needed is composed of various signaling points, which both perform message discrimination (read the address and determine if the message is for that node), and route messages to other signaling points. The basic three types of signaling points are: (1) Service Switching Points (SSPs); (2) Signal Transfer Points (STPs); and (3) Service Control Points (SCPs), each of which are described in more detail hereinafter.

With reference now to FIG. 1 of the drawings, the many Service Switching Points (SSPs) 100 serve as the exchanges in a telephone network 90, a portion of which is shown in FIG. 1. Across the country, groups of SSPs 100 are divided into separate Local Access Transport Areas (LATA) 130. Calls placed within a single LATA 130, intraLATA, are handled by the local exchange carriers (LEC), e.g., GTE, while calls placed interLATA, that is between separate LATAs 130, are handled by Interexchange Carriers (IXC), e.g., AT&T, which provide long-distance service to customers within a number of LATAs. The LECs and IXCs are separate types of SSPs 100, which provide either local or long-distance service respectively to subscribers.

The STP 110 serves as a router, and switches messages received from a particular SSP 100 through the network 90 to their appropriate destinations (another SSP 100). As is also understood in the art, the STP 110 receives messages in packet form from the SSPs 100. These packets are either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information.

Presently, a subscriber on one SSP 100 has the ability to move to a different SSP 100 within the same LATA 130 while retaining their public directory number. This is referred to as local number portability. One key advantage of local number portability is that other subscribers can connect to the ported subscriber without any changes to their dialing procedures.

If a subscriber has been ported-out to another SSP 100, the Initial Address Message (IAM) sent by the originating SSP 100 must be modified to account for the change in the terminating SSP, as is understood in the art. The Local Number Portability (LNP) database is the database that holds the Location Routing Numbers (LRN), which are ten-digit numbers used to uniquely identify the switch that has the ported-out number. Specifically, the LRN is the number for the recipient switch, which is the switch that has ported-in a number from another switch (called a donor switch). This ported-in number was not previously served by the recipient switch.

Typically, the SSP 100 sends a LNP query to the SCP 120, which accesses the LNP database in order to retrieve the routing information for a ported subscriber. The query response by the SCP 120 provides that SSP 100 with the pertinent LRN, which is populated (that is placed) in the Called Party Number (CPN) parameter in the IAM. The Ported Dialed Number (PDN), e.g., the actual dialed digits for the ported-out subscriber, is placed in the Generic Address Parameter (GAP) in the IAM. The Forward Call Indicator (FCI) M-bit in the IAM is then updated to indicate that the number has been translated. The FCI M-bit is used as a fail-safe mechanism to prevent more than one LNP query from being launched on a call.

If the end-user has not been ported-out, the SCP 120 will return the actual dialed number, not the LRN, to be stored in the CPN parameter. In this case, the GAP is not included in the IAM. It should be noted that the FCI M-bit is always set to "Number Translated" after any LNP query, regardless of whether the end-user has been ported-out or not.

Each subscriber has associated therewith a three-digit Numbering Plan Area (NPA), e.g., area code, and a three-digit Office Code (NXX), e.g., the first three digits of a seven-digit telephone number. Each SSP stores within it a list of LNP triggers, which are the NPANXX digit streams associated with subscribers who have the ability to port, whether or not any subscribers having that NPANXX actually are ported. Every time a call is placed to a subscriber on a different SSP than the calling party's SSP, the originating SSP, which is the SSP responsible for the subscriber placing the call, checks the LNP trigger for the called party to determine if a LNP query should be performed prior to routing the call to the called party's switch. Each LNP trigger has a condition known as a LNP trigger criteria type associated with it. The LNP trigger criteria types are indicators stored in the switch by command or other method, which can be set to either "query" or "do not query", depending upon different conditions.

Presently, for calls to subscribers having a NPANXX which is a LNP trigger, which are routed to a Local Exchange Carrier (LEC), the LNP trigger criteria type is always set to either "query", which instructs the originating SSP to perform a LNP query to the SCP before routing the call to the LEC, or "do not query", which instructs the originating SSP to never perform a LNP query prior to routing the call to the LEC, regardless of the LNP querying capability of the LEC. Therefore, for conventional systems to be implemented successfully, all local exchange carriers (LECs) would need to possess LNP querying capability to deliver calls to ported numbers. Otherwise, the calls would be routed to the donor switches, which results in excessive switching and delays. However, with the deregulation the number of available LECs will increase and it will not be possible for all the LECs to provide LNP querying capability.

Existing systems also present a problem in the case where a single switch acts as both an end office (EO) and a LEC without loop back of calls, which is explained hereinafter. Many EO/LEC switches have a logical boundary between the EO services and the LEC services. Therefore, when a long-distance call is placed, the EO actually routes the call on trunk lines out of the switch back to the LEC in the switch, which enables the EO and the LEC to function independently within the same switch. Thus, for a call to a NPANXX having a "do not query" LNP trigger criteria type associated with it, the EO will route the call to the appropriate LEC, either within its switch or to another chosen by the subscriber, for a LNP query.

However, when no logical boundary exists between the EO and the LEC, and the internal LEC is used to place a call to a NPANXX having a "do not query" LNP trigger criteria type associated with it, the EO/LEC does not perform the LNP query. Instead, the EO/LEC routes the call to the donor switch, thus incurring a charge from the donor switch for a LNP query which the EO/LEC was capable of performing.

Furthermore, conventional systems employing LNP querying for LEC routed calls do not allow local service providers (SSPs) to sell their LNP querying capability on a per carrier basis, which is inefficient for both the SSPs and the LECs.

In U.S. patent application Ser. No. 08/928,295, docket number 27943-00174, filed Sep. 12, 1997, and having the same Assignee as the instant application, there is disclosed an Interexchange Carrier Escape List for Local Number Portability. However, the foregoing does not present a solution for LECs.

It is therefore one object of the invention to provide LNP querying by the SSP for calls routed to selective LEC that do not possess LNP querying capability to prevent routing of calls to donor switches.

It is a further object of the invention to allow local SSPs to sell their LNP querying capability on a per carrier basis.

It is still a further object of the invention to allow the EO within the EO/LEC single switch, which does not have the loop back of calls ability, to perform a LNP query for the LEC regardless of whether the LNP trigger criteria type is set to "query" or "do not query".

SUMMARY OF THE INVENTION

The present invention is directed to telecommunications systems and methods for managing LNP querying for calls routed to carriers (LECs) by providing a list of carriers in the SSP (local service provider) for whom LNP querying is to be performed by the SSP. For example, calls destined to carriers on the list will be queried by the originating SSP, or other intermediate SSP where the list is present, and calls destined for carriers not on the list will not be queried by the originating SSP, but instead will be directly routed to that carrier for LNP querying. Advantageously, the local service providers (SSPs) can perform LNP queries primarily for calls destined to certain carriers and charge those carriers for the queries on a per carrier basis. This will enable smaller LECs to provide competitive service in the network by purchasing the LNP querying capability from the SSPs. In addition, larger LECs can choose to maintain their LNP querying capability and not purchase it from the SSPs, although there may be instances where LNP queries are performed by the SSPs. Alternatively, larger LECs can opt to remove their LNP querying capability and purchase it from the SSPs depending on the particular needs of the company and the cost-efficiencies of performing LNP queries. The innovative systems and methods of the present invention help to prevent routing of calls to donor switches, when using an LEC, by allowing the SSPs to perform LNP queries on a per carrier basis.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
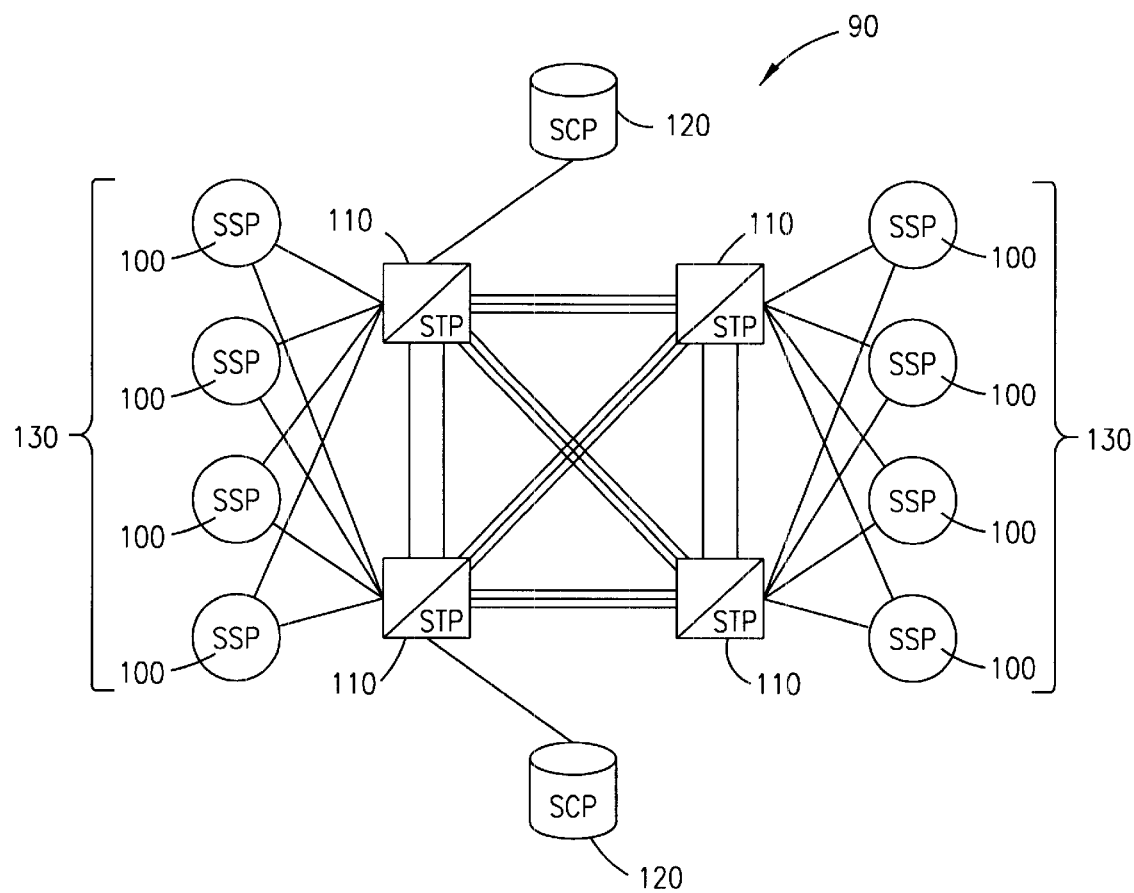
FIG. 1 is a block diagram illustrating some of the basic components used in an Intelligent Network or an Advanced Intelligent Network for signal switching.
Figure 2:
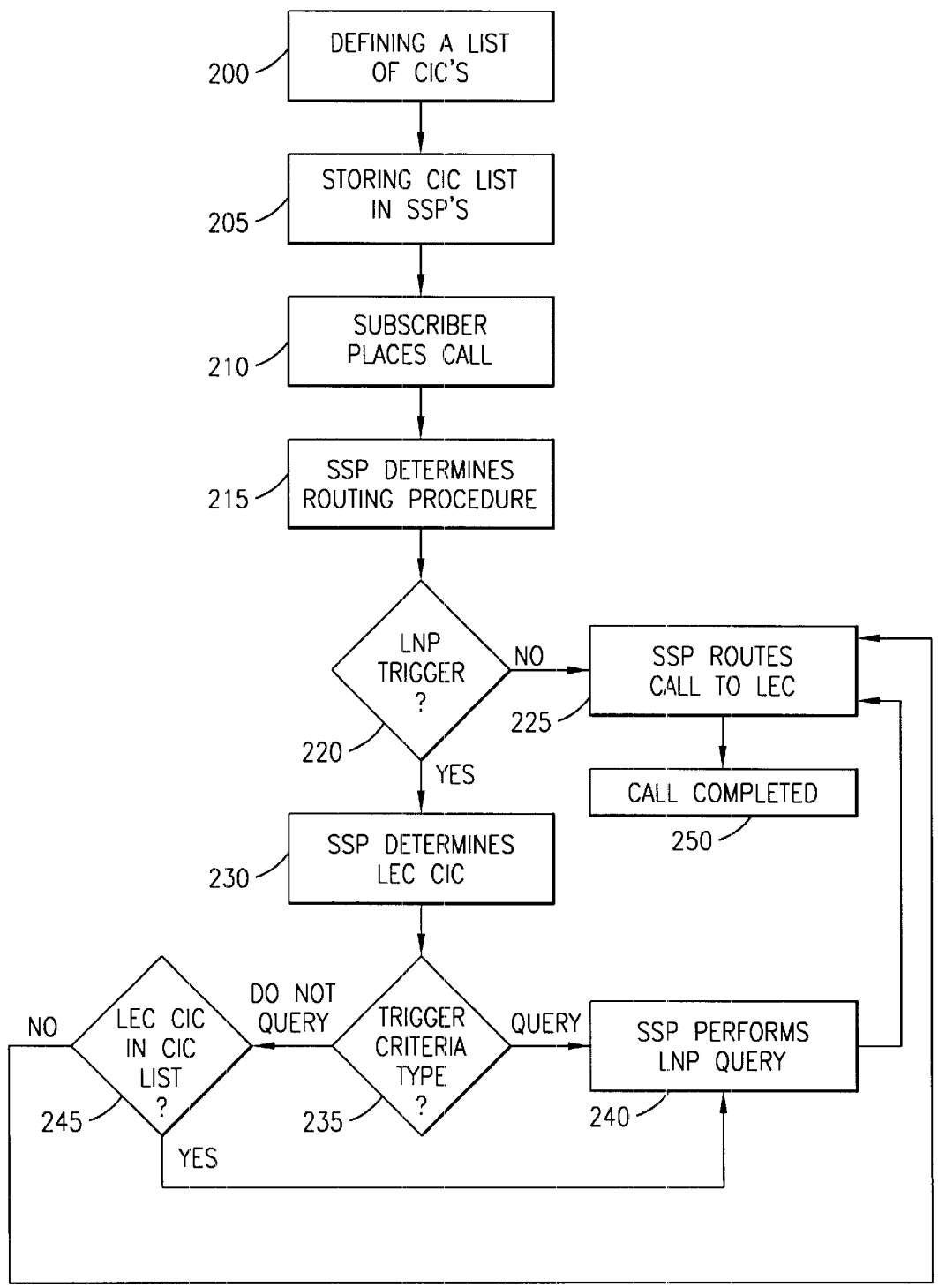
FIG. 2 is flow chart describing a preferred embodiment of the Carrier Identification Code system of the present invention.

With reference now to FIG. 2 of the drawings, a preferred embodiment of the LNP querying system of the present invention for LEC routed calls is depicted in which a list of carriers, by Carrier Identification Codes, is defined (step 200) and stored (step 205), for example, as a database in a memory, in the SSPs (local service providers).

Once a subscriber places a call (step 210), the originating SSP 100 determines the routing procedure (step 215), e.g., by a method known as B number analysis, which takes each dialed digit and compares it with a set of translation tables, called exchange data, to determine if the call is to its switch or to another switch, either within its LATA 130 (intraLATA) or in another LATA 130 (interLATA), as is well known in the art. If the call is an intraLATA call, as determined by the aforementioned B number analysis method, the originating SSP 100 first compares the NPANXX digit stream dialed by the calling party with a list of LNP triggers (step 220), which are NPANXX digit streams having subscribers who may be ported, to determine if the called party has the ability to port. If the NPANXX is not an LNP trigger, the originating SSP 100 routes the call to the LEC (step 225) to establish a connection with the terminating SSP 100 (step 250), which is the SSP 100 serving the called party.

However, if the call is an intraLATA call and the NPANXX is a LNP trigger, the originating SSP 100 then checks to determine the LEC selected by the calling party. The calling party can select a LEC immediately prior to the call, or have a presubscribed carrier associated with it (step 230). Recent deregulation allows a subscriber to use any intraLATA for any call, regardless of the presubscribed carrier chosen.

Thereafter, the originating SSP 100 checks the LNP trigger criteria type (step 235), e.g., "query" or "do not query", for intraLATA carrier destined calls, in addition to other checks, as is well-known in the art. If the LNP trigger criteria is set to "query", the SSP 100 performs the LNP query (step 240) prior to routing the call to the LEC (step 225). However, if the LNP trigger criteria is set to "do not query", the originating SSP 100 then compares the Carrier Identification Code (CIC) for the LEC chosen, with the list of CICs stored in the SSP 100 (step 245) to determine whether the carrier (LEC) chosen by the calling party has instructed the originating SSP 100 to perform the LNP query even though the LNP trigger criteria is set to "do not query". If the CIC for the chosen carrier is on the list stored in the originating SSP 100, the SSP 100 will perform the LNP query to the SCP 120 (step 240) prior to routing the call to the LEC (step 225).

If, however, the CIC for the chosen carrier is not on the list stored in the SSP 100, the SSP 100 will not perform a LNP query, but instead will route the call to the LEC to perform a LNP query (step 225). The call is then completed (step 250) normally, as is well-known in the art.

Figure 3A:
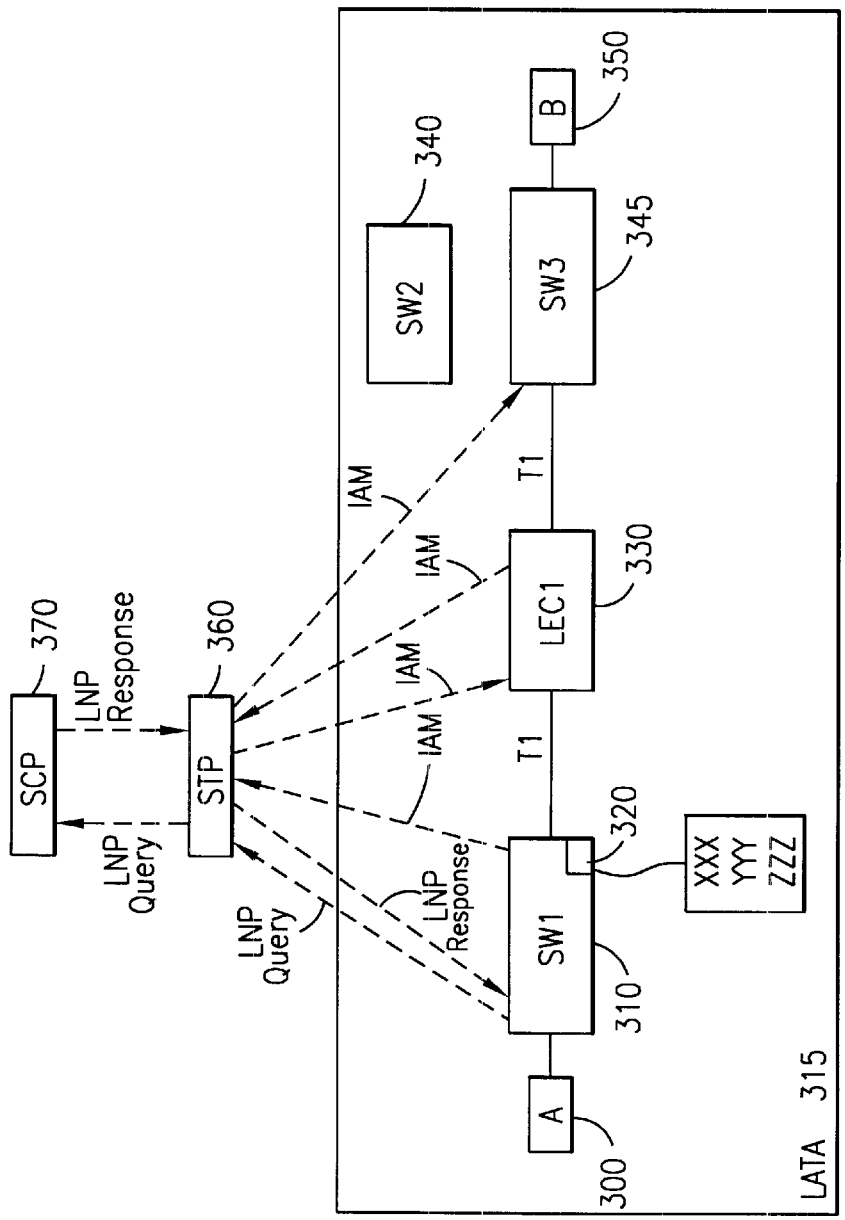
FIGS. 3A and 3B are block diagrams demonstrating sample LNP querying situations for LEC routed calls.
Figure 3B:
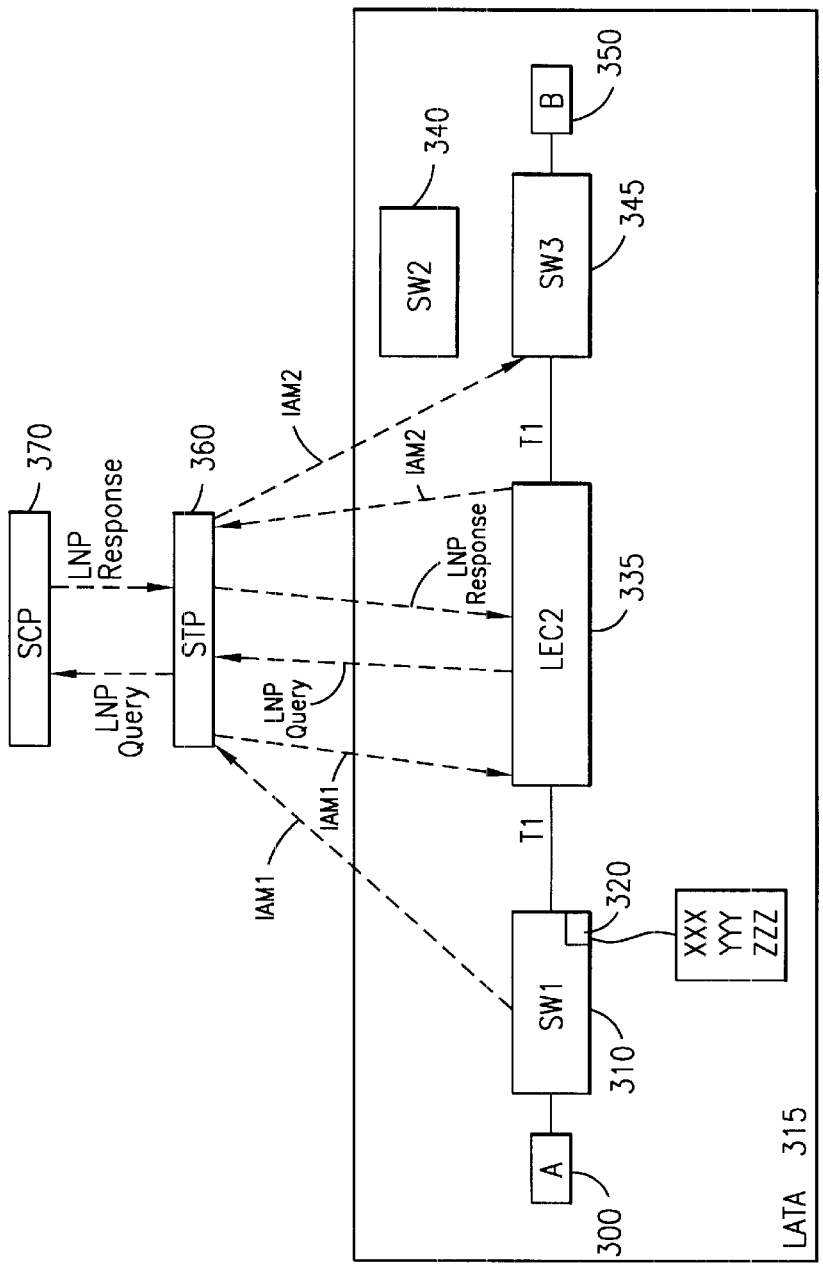

The logical relationship between the SSPs and the LECs is further illustrated in FIGS. 3A and 3B. For the case where the LNP trigger criteria is set to "do not query", there are two possible outcomes, each of which are shown separately in FIGS. 3A and 3B. As depicted in FIG. 3A, subscriber A 300, which is in a LATA 315, has placed a call to subscriber B 350, which has been ported-out from Switch-2 340 to Switch-3 345 also within LATA 315, referred to as SW2 and SW3, respectively. To connect the call, subscriber A 300 has chosen Local Exchange Carrier LEC1 330, either as a presubscribed carrier or as a dialed carrier, which is a non-LNP capable LEC. Initially, the originating SSP 310, hereinafter referred to as SW1, must first determine whether the NPANXX digit stream dialed by subscriber A 300 is a LNP trigger. Assuming that the NPANXX is a LNP trigger, SW1 310 then determines the Carrier Identification Code (CIC) for LEC1 330, e.g., XXX. For the case where the LNP trigger criteria is set to "do not query", SW1 310 then compares the CIC for LEC1 330 with a list of CICs 320 stored in SW1 310, which are associated with Local Exchange Carriers that have paid SW1 310 to perform the LNP query prior to routing.

As can be seen in FIG. 3A, XXX is on the list of CICs 320 stored in SW1 310, and therefore, SW1 310 will perform the LNP query, through signaling channels, shown as dotted lines, towards the SCP 370 through the STP 360. Based on the results received from the LNP response, the originating switch SW1 310 then modifies the Initial Address Message (IAM) by placing the Location Routing Number (LRN) for the recipient switch SW3 345 in the Called Party Number parameter and the Ported Dialed Number (PDN) for subscriber B 350 in the Generic Address Parameter (GAP), as described hereinbefore, and as is well-known in the art. SW1 310 also sets the FCI (M-bit) to "Number Translated", as discussed hereinbefore.

Thereafter, SW1 310 routes the IAM on signaling channels to the LEC1 330 via the STP 360 and seizes a physical channel T1 for routing of the call to the LEC1 330. The LEC1 330 then routes the IAM to the recipient switch SW3 345 via the STP 360 and seizes physical channel T1 for routing of the call to SW3 345. SW3 345 then terminates the call on its switch to subscriber B 350.

However, as shown in FIG. 3B, if the LNP trigger criteria is set to "do not query" and the CIC associated with LEC2 335, which is LNP capable, is WWW, the originating switch SW1 310 will route the call to the LEC2 335 without performing a LNP query, because the CIC, WWW, is not on the list 320 of CICs for whom querying is to be performed by SW1 310. In this situation, the LEC2 335 will perform the LNP query and modify the original IAM (IAM1) accordingly, as discussed hereinbefore. The modified IAM (IAM2) is then sent to the recipient switch SW3 345 via the STP 360, where the call can then be terminated to subscriber B 350.

The list 320 of Carrier Identification Codes stored in the SSPs 310, which are associated with LECs 330 and 335 wanting the SSPs 310 to perform LNP queries, along with the LNP trigger criteria types, e.g., "query" or "do not query", enable LNP and non-LNP capable LECs 335 and 330, respectively, to effectively handle ported-out calls, without unduly burdening the donor switches 340. LECS without LNP querying capability 330 can pay the SSPs 310 to perform their LNP queries and SSPs 310 can charge the LECs 330 for LNP queries on a per carrier basis. Therefore, in a preferred embodiment, the LNP trigger criteria type will always be set to "do not query" in order to prevent querying by SSPs 310 for LECs that are LNP capable 335. In the aforementioned manner, the SSPs 310 would only query for those LECs 330 who have paid for the service on a per carrier basis.

In addition, for the EO/LEC 310/330 single switch situation, by having a list 320 of CICs stored within the switch, which includes the LEC 330 of the switch, the EO/LEC 310/330 is prevented from routing the call to the donor switch 340. For example, if the LNP trigger criteria type is set to "do not query", the EO 310 will check the CIC list 320 and compare it to the CIC of the LEC 330 used by the calling party. If the LEC 330 used by the subscriber is the LEC 330 within the switch, and the CIC for that LEC 330 is on the list 320, the EO 310 will perform a LNP query for the call and route it to the appropriate terminating switch 345.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for performing a local number portability query when a call is routed through one of a plurality of local exchange carriers, said system comprising:

a plurality of local service switching points, each of said local service switching points being connected to at least one of said local exchange carriers, each of said local exchange carriers having a carrier identification code associated therewith, a first local service switching point having a code list stored therein, said code list containing each said carrier identification code associated with each of said local exchange carriers requesting said first local service switching point to perform said local number portability query therefor;

determining means for determining whether to perform a local number portability query for a particular call by said local service switching point by comparing said carrier identification code associated with a given local exchange carrier for said call with said code list, said first local service switching point selectively performing said local number portability query for said when said carrier identification code associated with said given local exchange carrier is in said code list; and routing means for routing said call through said given local exchange carrier to a second local service switching point said system establishing a call connection between said first and second local service switching points.

2. The telecommunications system of claim 1, wherein said call has a criteria type associated therewith, said criteria type being stored in said first local service switching point, said first local service switching point performing said local number portability query when said criteria type is set to a query.

3. The telecommunications system of claim 2, wherein said criteria type is associated with a local number portability trigger, said local number portability trigger including a three-digit Numbering Plan Area and a three-digit Office Code.

4. The telecommunications system of claim 3, wherein said local number portability trigger is associated with a plurality of subscribers, each said subscriber having the ability to port.

5. The telecommunications system of claim 1, wherein said call has a criteria type associated therewith, said first local service switching point performing said local number portability query when said criteria type is set to do-not-query and said carrier identification code associated with said given local exchange carrier is in said code list.

6. The telecommunications system of claim 1, wherein said call has a criteria type associated therewith, said given local exchange carrier performing said local number portability query when said criteria type is set to do-not-query and said carrier identification code associated with said given local exchange carrier in not in said code list.

7. The telecommunications system of claim 1, further comprising:

a plurality of signaling transfer points, each of said signaling transfer points being in communication with at least one of a plurality of service control points, said first local service switching point forwarding said local number portability query to a given service control point through a given signaling transfer point and receiving a response from said given service control point.

8. The telecommunications system of claim 7, wherein said given service control point communicates with a local number portability database to perform said local number portability query.

9. The telecommunications system of claim 7, wherein said first local service switching point creates an address message having routing information therein, and wherein, based on said response, said system uses said address message to mute said call to said second local service switching point.

10. The telecommunications system of claim 9, wherein said address message comprises:
    a Called Party Number parameter,
    a Generic Address parameter, and
    a Forward Call Indicator M-bit.

11. The telecommunications system of claim 10, wherein said routing information includes a Location Routing Number and a Ported Dialed Number, said Location Routing Number being located in said Called Party Number parameter, said Ported Dialed Number being located in said General Address Parameter, and said Forward Call Indicator M-bit being set to Number-Translated.

12. The telecommunications system of claim 10, wherein said routing information includes an actual dialed number, said actual dialed number being returned from said given service control point into said Called Party Number parameter, said Forward Call Indicator M-bit being set to Number-Translated.

13. The telecommunications system of claim 1, wherein said second local service switching point is a recipient switch.

14. The telecommunications system of claim 1, wherein said given local exchange carrier is not capable of performing said local number portability query.

15. The telecommunications system of claim 1, wherein said given local exchange carrier is capable of performing said local number portability query.

16. The telecommunications system of claim 1, wherein said first local service switching point and said given local exchange carrier are located within a given switch.

17. The telecommunications system of claim 1, wherein said first local service switching point charges said given local exchange carrier for performing said local number portability query on a per carrier basis.

18. The telecommunications system of claim 1, wherein said given local exchange carrier is a presubscribed carrier.

19. The telecommunications system of claim 1, wherein said given local exchange carrier is a dialed carrier.

20. A method for performing a local number portability query when a call is routed through one of a plurality of local exchange carriers, each of said local exchange carriers having a carrier identification code associated therewith, said method comprising the steps of:

defining a code list and storing said code list in a first local service switching point, said code list containing each said carrier identification code associated with each of said local exchange carriers requesting said first local service switching point to perform said local number portability query therefor;

determining whether to perform a local number portability query for a particular call by comparing the carrier identification code associated with a given one of said local exchange carriers and further associated with said call with said code list;

selectively performing, by said first local service switching point said local number portability query for said call when said carrier identification code associated with said given local exchange carrier is in said code list; and routing said call through said given local exchange carrier to a second local service switching point.

21. The method of claim 20, wherein said call has a criteria type associated therewith, said criteria type being stored in said first local service switching point, said method further comprising the step of:

performing, prior to said step of comparing, said local number portability query by said first local service switching point when said criteria type is set to query.

22. The method of claim 21, wherein said criteria type is associated with a local number portability trigger, said local number portability trigger including a three-digit Numbering Plan Area and a three-digit Office Code.

23. The method of claim 22, wherein said local number portability trigger is associated with a plurality of subscribers, each said subscriber having the ability to port.

24. The method of claim 20, wherein said call has a criteria type associated therewith, said step of performing said local number portability query being realized when said criteria type is set to do-not-query and said carrier identification code associated with said given local exchange carrier is in said code list.

25. The method of claim 20, wherein said call has a criteria type associated therewith, said method further comprising the step of:

performing, prior to said step of routing, said local number portability query by said given local exchange carrier when said criteria type is set to do-not-query and said carrier identification code associated with said given local exchange carrier in not in said code list.

26. The method of claim 20, wherein, in said step of selectively performing, said first local service switching point forwards said local number portability query to a given service control point through a given signaling transfer point and receives a response from said given service control point.

27. The method of claim 26, wherein said service control point communicates with a local number portability database to perform said local number portability query.

28. The method of claim 26, wherein said step of routing further comprises the step of:

creating, by said local service switching point, an address message having routing information therein, based on said response.

29. The method of claim 28, wherein said address message comprises:

a Called Party Number parameter,
a Generic Address parameter, and
a Forward Call Indicator M-bit.

30. The method of claim 29, wherein said muting information includes a Location Routing Number and a Ported Dialed Number, said Location Routing Number being located in said Called Party Number parameter, said Ported Dialed Number being located in said General Address Parameter, and said Forward Call Indicator M-bit being set to Number-Translated.

31. The method of claim 29, wherein said routing information includes an actual dialed number, said actual dialed number being returned from said given service control point into said Called Party Number parameter, said Forward Call Indicator M-bit being set to Number-Translated.

32. The method of claim 20, wherein said second local service switching point is a recipient switch.

33. The method of claim 20, wherein said given local exchange carrier is not capable of performing said local number portability query.

34. The method of claim 20, wherein said given local exchange carrier is capable of performing said local number portability query.

35. The method of claim 20, wherein said first local service switching point and said given local exchange carrier are located within a given switch.

36. The method of claim 20, wherein said first local service switching point charges said given local exchange carrier for performing said local number portability query on a per carrier basis.

37. The method of claim 20, wherein said given local exchange carrier is a presubscribed carrier.

38. The method of claim 20, wherein said given local exchange carrier is a dialed carrier.

39. The method of claim 20, wherein said code list consists of a first code type and a second code type, said first code type being a three-digit code, said second code type being a four-digit code.

* * * * *